(12) United States Patent
Vaissiere

(10) Patent No.: US 10,948,290 B2
(45) Date of Patent: Mar. 16, 2021

(54) METHOD FOR DETECTING THE TILT OF A FLOATING ROOF FLOATING ON A MEDIUM STORED IN A TANK

(71) Applicant: Endress+Hauser Consult AG, Reinach (CH)

(72) Inventor: Dimitri Vaissiere, Rixheim (FR)

(73) Assignee: Endress+Hauser Group Services AG, Reinach (CH)

( * ) Notice: Subject to any disclaimer, the term of this patent is extended or adjusted under 35 U.S.C. 154(b) by 264 days.

(21) Appl. No.: 16/226,928

(22) Filed: Dec. 20, 2018

(65) Prior Publication Data

US 2019/0195629 A1 Jun. 27, 2019

(30) Foreign Application Priority Data

Dec. 22, 2017 (DE) ...................... 10 2017 131 213.7

(51) Int. Cl.
| | | |
|---|---|---|
| *G01C 9/00* | (2006.01) | |
| *G01F 23/284* | (2006.01) | |
| *G01F 23/64* | (2006.01) | |
| *G01S 13/88* | (2006.01) | |
| *G01S 13/08* | (2006.01) | |
| *G01B 15/00* | (2006.01) | |

(52) U.S. Cl.
CPC .............. *G01C 9/00* (2013.01); *G01B 15/00* (2013.01); *G01F 23/284* (2013.01); *G01F 23/64* (2013.01); *G01S 13/08* (2013.01); *G01S 13/88* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,694,773 A | * | 9/1987 | Sparkes ................... | H01Q 1/34 114/354 |
| 5,614,831 A | * | 3/1997 | Edvardsson .......... | G01F 23/284 324/642 |

(Continued)

FOREIGN PATENT DOCUMENTS

| | | |
|---|---|---|
| WO | 2013070131 A1 | 5/2013 |
| WO | 2014098696 A1 | 6/2014 |

OTHER PUBLICATIONS

Search Report for German Patent Application No. 10 2017 131 213.7, German Patent Office, dated Sep. 26, 2018, 6 pp.

*Primary Examiner* — Mamadou L Diallo
(74) *Attorney, Agent, or Firm* — Kelly J. Smith; Endress+Hauser (USA) Holding Inc.

(57) ABSTRACT

The present disclosure concerns a method for detecting the tilt of a roof floating on a medium in a tank, wherein a radar level gauge is mounted in a fixed position on the tank and emits signals in the direction of the roof. The method includes: determining and recording the level of the floating roof during a period of time including some filling/emptying cycles of the medium in the tank, detecting and recording the echo amplitudes of the echo signals during said period of time, filtering the echo amplitudes and recording the filtered echo amplitudes, calculating the gradient of the filtered echo amplitudes, calculating a threshold value for a tolerable deviation of the gradient of the filtered echo amplitudes, and generating an alert message that a roof tilting is detected if the deviation of the gradient falls behind the threshold.

11 Claims, 3 Drawing Sheets

(56) References Cited

U.S. PATENT DOCUMENTS

| | | | |
|---|---|---|---|
| 7,635,854 B1* | 12/2009 | Babin | G01F 23/2928 |
| | | | 250/573 |
| 2008/0282794 A1* | 11/2008 | Jirskog | G01F 23/284 |
| | | | 73/292 |
| 2009/0315758 A1* | 12/2009 | Jirskog | G01S 7/038 |
| | | | 342/124 |
| 2013/0120155 A1* | 5/2013 | Hagg | B65D 88/34 |
| | | | 340/870.01 |
| 2014/0174172 A1* | 6/2014 | Hagg | B65D 88/40 |
| | | | 73/290 V |
| 2015/0009063 A1* | 1/2015 | Korsbo | G01F 23/284 |
| | | | 342/124 |

* cited by examiner

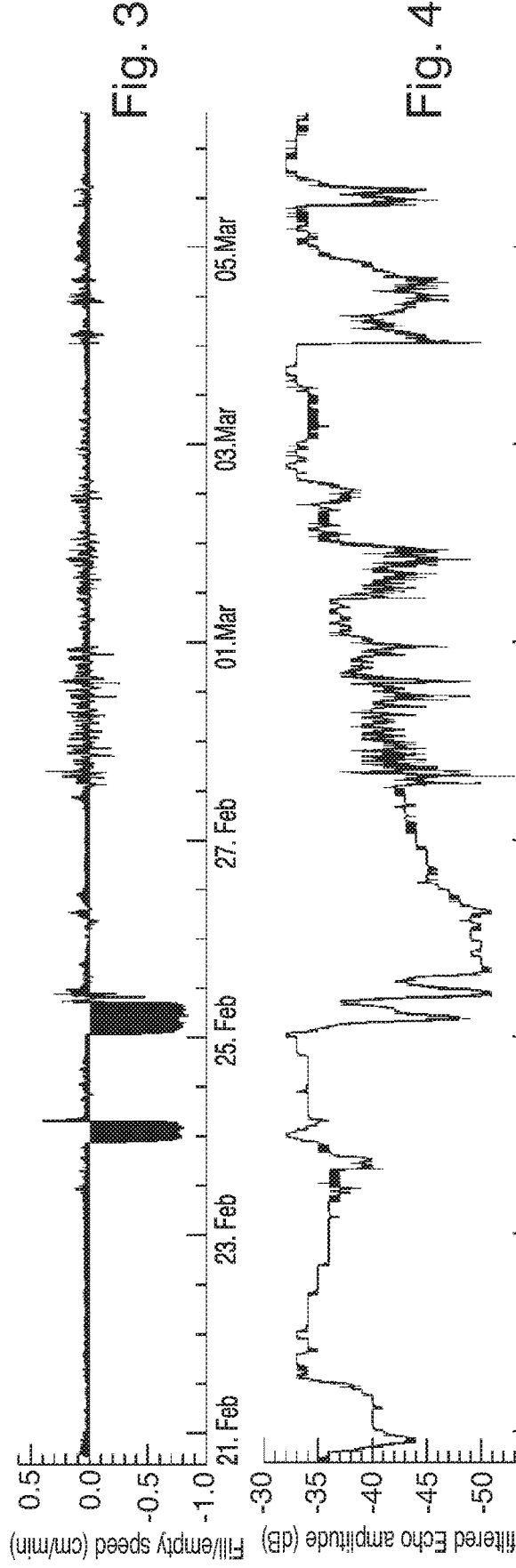

METHOD FOR DETECTING THE TILT OF A FLOATING ROOF FLOATING ON A MEDIUM STORED IN A TANK

CROSS-REFERENCE TO RELATED APPLICATION

The present application is related to and claims the priority benefit of German Patent Application No. 10 2017 131 213.7, filed on Dec. 22, 2017, the entire contents of which are incorporated herein by reference.

TECHNICAL FIELD

The present disclosure refers to method for detecting the tilt of a floating roof floating on a medium stored in a tank. Furthermore, the present disclosure refers to a system for detecting the tilt of a floating roof floating on a medium stored in a tank, whereby a radar level gauge is mounted in a fixed position on the tank, whereby the radar level gauge is emitting signals in the direction of the floating roof and receiving the echo signals reflected on the surface of the floating roof. The signals can be ultrasonic or high-frequency signals, in particular microwave signals.

BACKGROUND

The present disclosure is used in connection with large tanks. In large liquid tanks, in particular in fuel or oil tanks at refineries and the like, which can hold large amounts of oil products, use is frequently made of a floating roof which floats on the liquid in the tank and is therefore displaceable in a vertical direction. Thus, the floating roof is capable of following the level of a liquid (for example, an oil product), when the liquid is discharged from or filled into the tank. Floating roofs of this type are used for preventing leakage of vapors and gases from the tank into the atmosphere and ingress of e.g. rainwater from the surroundings into the liquid.

Typically, the prevention of leakage and ingress is enhanced by a sealing arrangement fitted along a perimeter of the floating roof for providing sealing and sliding contact with the inner wall of the tank. Further, using a roof that floats on the liquid enables minimizing a space between the liquid and the roof and thereby minimizing the amount of gases and liquid in vapor form in this space. In case of fuel and oil tanks, the environment on top of the floating roof is a hazardous or potentially hazardous environment. Floating roofs for these purposes are usually manufactured as large steel structures with float means (pontoons) and have a weight in the order of a hundred tons and a diameter of tens of meters. Regarding size and environmental aspects, it is important to monitor the normal operation by a monitoring system.

The purpose of such a monitoring system is to have control of the floating roof, i.e. to make sure that unwanted situations related to cases when the roof does not float properly on the product surface are detected. There are also advantages related to environmental requirements, e.g. to avoid evaporation of volatile hydrocarbons into the environment in case the roof gets flooded with product. Finally, the monitoring system may eliminate or at least reduce the need for inspection activities. Typically, the pontoons of a floating roof must be inspected for leakage in regular time intervals by a person that opens up the hatches in the pontoons. This type of work has certain personal risks and could be minimized with a roof tilt detection system. The monitored distance between the floating roof and the medium surface is normally substantially constant. Due to external influence such as wind, rain or snow, minor deviations of a few cm are acceptable, but deviations exceeding a certain threshold (e.g. more than 5 cm in some applications) typically indicate some kind of fault or undesired condition. It would be desirable to provide diagnostics functionality for predicting when there are prevailing fault conditions, so that such fault conditions may be addressed before any incident occurs.

A floating roof tilt detection method is described in WO 2014/098696 A1. The known solution is able to identify an undesired condition in the function of a floating roof of a tank, said method comprising: a) determining a filling level of a product in said tank using a first level gauge emitting electromagnetic signals into said tank and receiving electromagnetic echo signals reflected by a surface of said product, b) detecting a reference distance between a reference position on said roof and said surface using a second level gauge mounted on said roof, c) forming a reference distance deviation as a difference between said reference distance and an expected value, d) comparing said reference distance deviation with a specified range, e) if said reference distance deviation is outside said specified range, storing a data set including said reference distance deviation and said filling level, f) repeating steps a) to e) for a plurality of points in time, g) based on stored data sets of reference distance deviations and filling levels, identifying said undesired condition. The steps a) to e) are performed during a plurality of filling-emptying cycles. Step g) comprises: establishing that deviations stored during consecutive filling-emptying cycles, and identifying said undesired condition as a problem in an interface between a tank wall and said roof.

WO 2014/098696 A1 refers to a monitoring system for monitoring a floating roof of a floating roof tank containing a liquid and having a bottom, a cylindrical wall, a floating roof floating on said liquid, said system being arranged to determine a local status of said floating roof in at least three spaced apart sensing element locations of said floating roof. One radar level gauge is fixed in each of the three spaced apart sensing element locations on the floating roof. A monitoring circuitry receives the indications of the local status from each of the radar level gauges and determines an overall monitored status of said floating roof based on at least one of said indications of said local status. The known system is quite cost-intensive, as at least three radar level gauges are needed for monitoring the position of the floating roof.

SUMMARY

It is an object of the present disclosure to provide a method and a system for detecting the tilt of a floating roof floating on a medium stored in a tank, which is reliable and simple.

To this extent, the present disclosure describes a method for detecting the tilt of a floating roof floating on a medium stored in a tank, whereby a radar level gauge is mounted in a fixed position on the tank, whereby the radar level gauge is emitting signals in the direction of the floating roof and receiving the echo signals reflected on the surface of the floating roof. The method comprises the steps of:

a) determining and recording the level of the floating roof during a period of time, whereby the period of time includes some filling/emptying cycles, preferably consecutive filling/emptying cycles of the medium in/from the tank, b) detecting and recording at least the echo amplitudes of the echo signals over the time during said period of time, c) filtering the echo amplitudes and recording the filtered echo amplitudes of the echo signals during said time period, d) calculating the gradient of the filtered echo amplitudes of the echo signals during said time period, e) calculating or providing a threshold value for an acceptable deviation of the gradient of the echo amplitudes of the echo signals during said time period, f) generating an alert message that a roof tilting is detected if the deviation of the gradient of the echo amplitudes of the echo signals falls behind the threshold.

The level of the roof is preferably detected by one radar level meter. The radar level meter emits radar signals, in particular microwave or ultrasonic signals, to the surface of the roof and receives the echo signals reflected on the roof. The level of the roof is determined by the run-time of the radar signals. In particular, the radar level meter can be a pulse radar device or an FMCW radar device.

The present disclosure further comprises the step of forming the threshold based on statistical calculations. In particular, use is made of the probability density function (PDF) of the gradient of the filtered echo amplitudes of the echo signals, collected during normal operations of filling/emptying without tilt issues. The threshold is then determined from the PDF with a predefined level of confidence (tolerance), determined in relation with the accepted risk of false positives and false negatives.

A refinement of the inventive solution refers to the steps of:
collecting data about the filling level of the medium in the tank during said time period,
forming the gradient of the collected filling level data, and
determining the filling/emptying speed of the medium in the tank.

The filling level of the medium in the tank is determined by the one radar level device. This is a big advantage regarding prior art solution where at four radar level devices are used.

A further refinement of the inventive method comprises the steps of:
forming the gradient of the filtered echo amplitudes of the echo signals during said time period,
determining the time slots when abnormal gradients of the filtered echo amplitudes of the echo signals appear where the filtered echo amplitudes of the echo signals fall behind the threshold, and
identifying the determined time slot/slots as fault condition/conditions where the floating roof was in a tilted position.

A further embodiment of the inventive method proposes the steps of:
forming the residue of the filtered echo amplitudes of the echo during said time period,
determining the time slot/slots when the residue of the filtered echo amplitudes of the echo signals falls behind the threshold, and
filtering the level measurement signals where the filter settings are related to the residue (residue noise).

A refinement of the method, described in at least one of the preceding claims comprises the steps of
comparing, during said time period, the residue of the filtered echo amplitudes with the filtered echo amplitudes of the echo signal, and
identifying only these time slot/slots as fault condition/conditions, where the floating roof was tilt, when the corresponding gradient of the filtered echo amplitudes of the echo signals falls behind the threshold.

Furthermore, it is proposed to dynamically adapt the filtering of the floating roof level signal outside the time slot/slots where an abnormal or fault condition is identified. By this step it is possible to reduce noise on the measured floating roof level signal and its gradient. By this adaptive filtering the measurement accuracy of the level measurement can be significantly improved.

It is a further refinement of the present disclosure if the amplitude of the gradient is determined during the time interval(s) when the floating roof has been tilted. The amplitude of the gradient is related to the tilt angle of the roof. Therefore, the knowledge of the amplitude of the gradient allows to calculate the tilting angle of the floating roof. This calculation is successful, as the dimensions and the mass of the roof are known.

An additional refinement of the inventive method proposes to determine the height of the floating roof in the tank at least during the time interval when a fault condition is detected. The knowledge of the height of the floating roof at the time when a fault condition, i.e. the tilted position of the floating roof is detected, indicates that there is, for example, a problem with the mechanical guidance of the roof at the corresponding altitude. In general, the refinement comprises the step of checking if a vertical mechanical guidance system for guiding the floating roof relative to the tank is defect at the height/heights where the fault condition/conditions has/have appeared. Such a defect may be the trigger for the roof tilting. Considering and analyzing the measuring data of the radar level meter over a more extended period of time may confirm this defect/these defects in the mechanical guidance system.

As previously mentioned, the present disclosure also refers to a system for detecting the tilt of a floating roof floating on a medium stored in a tank. The system is designed in such a way that it can perform the inventive method. The system comprises a radar level gauge or a radar level meter which emits signals in the direction of the floating roof and receives the echo signals reflected on the surface of the floating roof. Additionally, an edge device is provided which is remotely located from the radar level gauge. The edge device has a first data interface for communication with the radar level gauge and a second data interface for communication with a server or a server platform via internet. The edge device is the data storing and linking device between the radar level gauge and a server or a server platform in the cloud. The edge device is collecting and/or processing data of the level gauge over time, and transmits the time-stamped data from time to time via a secure communication line to the server/server platform in the cloud.

BRIEF DESCRIPTION OF THE DRAWINGS

The present disclosure and further advantages of the present disclosure are explained in more detail in the figures.

FIG. 3 shows a graph of the fill/emptying speed of the medium in the tank plotted against the time, FIG. 4 shows a graph of the unfiltered echo amplitudes (light or grey line) and the filtered echo amplitudes (dark or blue line) of the echo signals plotted against the time, FIG. 5 shows the corresponding gradient of the filtered echo amplitudes of the echo signals over the time, and FIG. 6 shows the corresponding residue of the filtered echo amplitudes of the echo signal over the time.

DETAILED DESCRIPTION

Figure 1:
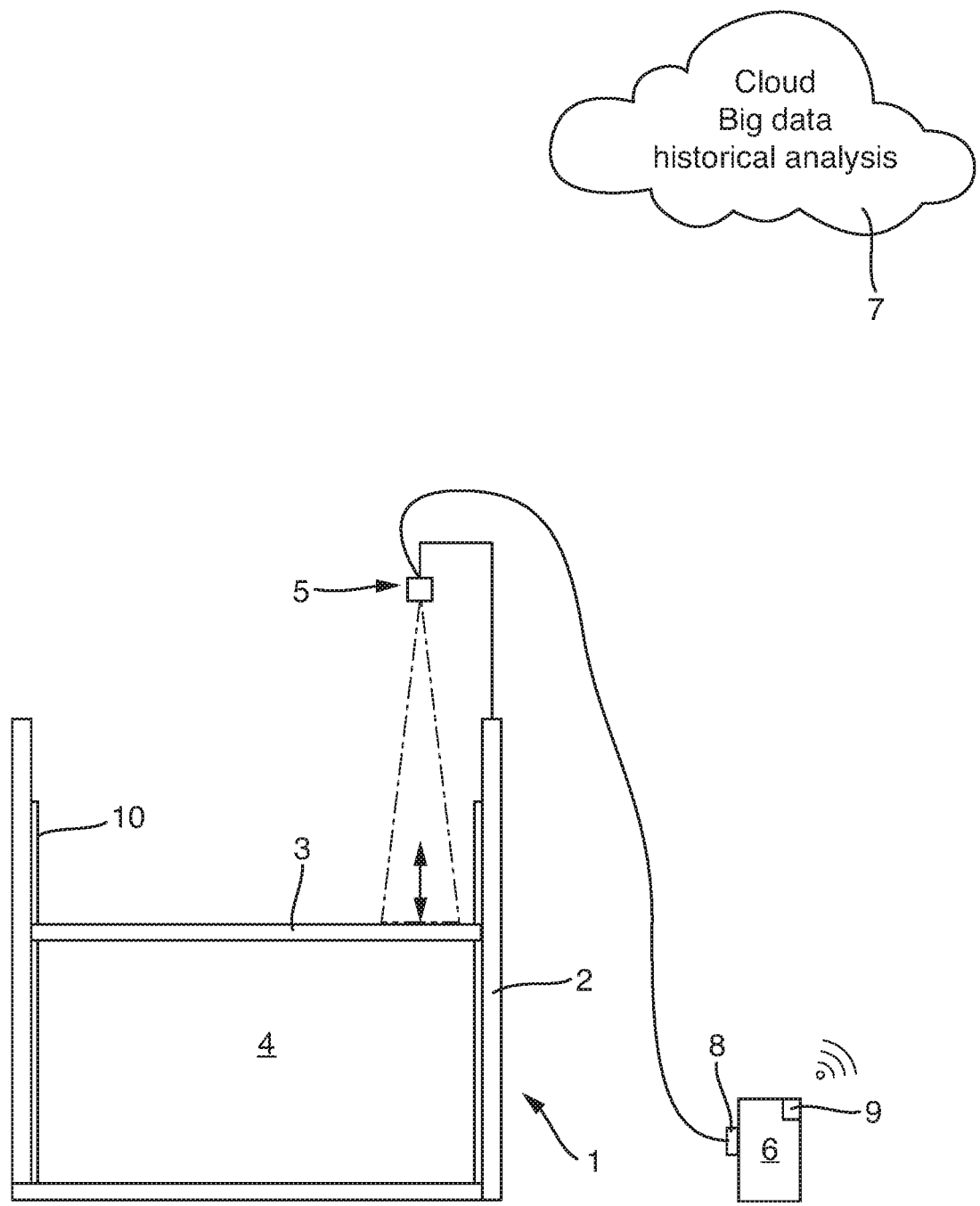
FIG. 1 shows a sketch of a system for detecting the tilt of a floating roof floating on a medium stored in a tank.

FIG. 1 shows a sketch of a system for detecting the tilt of a floating roof 3 floating on a medium 4 stored in a tank 1. A radar level gauge 5 is mounted in a fixed position on the tank 1 in such a way that the radar signals which are emitted by the radar level gauge and reflected on the surface of the floating roof 3 are received by the radar level gauge 5. A computation unit, in particular a microprocessor,—not shown in FIG. 1—is implemented in the housing of the radar level gauge 5 or in the housing of the edge device 6. The computation unit determines the travel distance and the level of the floating roof 3 in the tank 1, respectively by evaluating the corresponding run-time of the radar signals. Such radar level gauges are well-known. They are offered and sold, in different embodiments adapted to different applications, by Endress+Hauser under the name PROSONIC or MICROPILOT, for example.

The edge device 6 is the linking device between the inside sphere of the process owner—here the owner of the tank farm—and the outside sphere, i.e. the internet and the cloud 7, respectively. The edge device 6 is collecting time-stamped data of the radar level gauge 5, computing and transferring them to a server platform or a remote server in the cloud 7. The edge device 6 is remotely located from the radar level gauge 5, and has a first data interface 8 for communication with the radar level gauge 5, and a second data interface 9 for communication with the server or the server platform in the cloud 7. The communication between the radar level gauge 5—and maybe other field devices mounted in or on the tank 1 or in or an other tanks of the tank farm—and the edge device 6 is normally based on the HART protocol or another protocol (Profibus, Fieldbus Foundation, . . . ) used in process automation applications. But the data may also be transferred by standard protocols like Bluetooth and so on. The communication between the edge device 6 and the server platform/server in the cloud 7 is preferably based on a standard Internet protocol. In both cases, the communication can be wire-bound or wireless. The server platform in the cloud 7 may also be used for Big Data historical analysis of the data provided by the radar level gauge 5 and maybe other sensors or actuators, i.e. field devices. The server platform or the server in the cloud 7 can be used to receive information or warnings/alerts from the edge device 6 and trigger service operations from a service supplier.

Figure 2A:
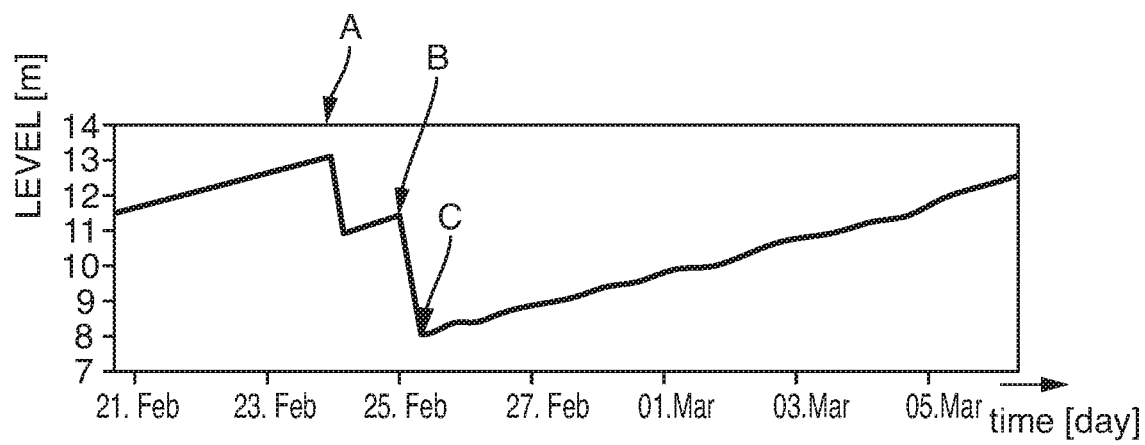
FIG. 2A shows the graph of the level of the floating roof plotted against the time.
Figure 2B:
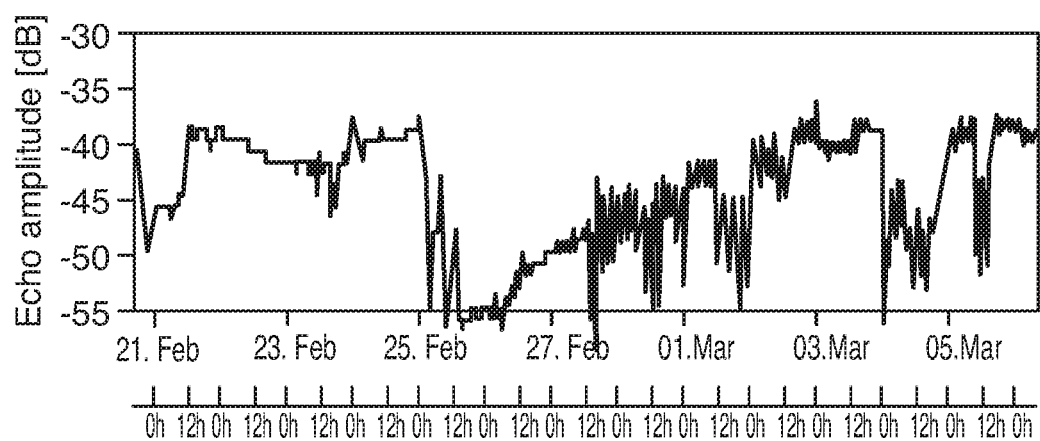
FIG. 2B shows the graph of the echo amplitudes of the echo signals plotted against the time.

FIG. 2A shows the graph of the level of the floating roof 3 during a given time period, while FIG. 2B shows the graph of the corresponding echo amplitudes of the echo signals during the same time period. Also the graphs shown in the following FIGS. 3-6 refer to the same given time period.

FIG. 2A visualizes the step of the inventive method: determining and recording the level of the floating roof 3 during a period of time, whereby the period of time includes some filling/emptying cycles of the medium in/from the tank 1. The graph of FIG. 2A shows that after some days of continuously filling the tank 1 with medium 4, the tank 1 is quite fast discharged in two steps (point A and B). At point C, the level of the medium 4 in the tank 1 has reached a minimum. Afterwards the level of the medium 4 in the tank 1 increases again continuously. FIG. 3 shows a graph of the fill/emptying speed of the medium 4 in the tank 1 plotted against the time during the time period. While the curve shown in FIG. 2A refers to the different levels of the of the medium 4 in the tank during the time period, FIG. 3 shows the gradient or the derivation of that curve.

FIG. 2B visualizes the next step of the inventive method: detecting and recording at least the echo amplitudes of the echo signals over the time during said period of time. The same time curve of the unfiltered echo amplitudes (see FIG. 2B) is again shown in FIG. 4 (light or grey line), but here together with the corresponding filtered echo amplitudes (dark or blue line). By filtering the echo amplitudes, the measurement accuracy can be improved. The graph shown in FIG. 4 refers to the following step of the inventive method: filtering the echo amplitudes and recording the filtered echo amplitudes of the echo signals during said time period.

The step of calculating the gradient of the filtered echo amplitudes of the echo signals during said time period is presented in FIG. 5. Additionally, FIG. 5 shows the feature of calculating or providing a threshold value T for a tolerable deviation of the gradient of the echo amplitudes of the echo signals during said time period. But FIG. 5 gives also some hints to the step of generating an alert message that a roof tilting is detected, if the deviation of the gradient of the echo amplitudes of the echo signals falls behind the threshold T.

The corresponding time intervals when such critical tilt positions of the floating roof 3 are detected, are encircled in FIG. 5. The duration of these time intervals indicates the time during that the floating roof 3 has been in a tilted position. It is also possible to give some information about the tilting angle of the floating roof 3, as the information about the level of the floating roof 3 at that time interval is also available. In the example, presented in the figures, the tilting of the floating roof 3 seems to be caused by a defect in the mechanical guidance system 10 of the floating roof 3 at altitudes of approximately 8 m, 10.5 m, 11 m and 12 m. Having available this information, the service people can focus on inspections of the mechanical guidance system 10 of the floating roof 3 at these altitudes. To improve the accuracy of the heights where the mechanical guidance system 10 works incorrectly, it is helpful to analyze an extended history of the available data as they are represented in the figures. It is proposed to make such big data analysis in the cloud 7. Bringing the data of different tanks in the cloud, a comparison of the data may be helpful in finding out if there are for example systematic faults in the guidance systems of the tanks.

FIG. 6 shows the corresponding residue of the filtered echo amplitudes of the echo signal over the time. According to an advantageous embodiment of the inventive method for detecting the tilt of a floating roof 3 which is floating on a medium 4 in a tank 1, the residue from signal filtration is used to implement a dynamic filter. In this case, a residue is defined as the small amount of the echo amplitudes that remains after the filtered echo amplitudes have been taken away from the unfiltered echo amplitudes of the echo signals. Removing the residue by a dynamic filter software during the time intervals when the gradient of the echo amplitudes of the echo signals does not indicate a tilting position of the floating roof 3 (see ellipses in FIG. 6) allows to improve the accuracy of the level measurement.

The invention claimed is:

1. A method for detecting the tilt of a floating roof floating on a medium stored in a tank, comprising:

providing a radar level gauge mounted in a fixed position on the tank, wherein the radar level gauge is configured to emit signals in the direction of the floating roof and to receive echo signals reflected on a surface of the floating roof;

determining and recording a level of the floating roof during a time period, wherein the time period includes some filling/emptying cycles of the medium in the tank;

detecting and recording echo amplitudes of the echo signals over the time period;

filtering the echo amplitudes and recording the filtered echo amplitudes during the time period;

calculating a gradient of the filtered echo amplitudes during the time period;

calculating a threshold value for a tolerable deviation of the gradient of the filtered echo amplitudes during the time period; and generating an alert message that a roof tilting is detected when the deviation of the gradient of the filtered echo amplitudes falls behind the threshold.

2. The method according to claim 1, wherein the calculating of the threshold value includes using a probability density function of the gradient of the filtered echo amplitudes.

3. The method according to claim 1, further comprising:
collecting data about a filling level of the medium in the tank during the time period;
forming a gradient of the collected filling level data; and
determining a filling/emptying speed of the medium in the tank.

4. The method according to claim 1, further comprising:
determining a time slot when abnormal gradients of the filtered echo amplitudes appear where the filtered echo amplitudes fall behind the threshold; and
identifying the determined time slot as a fault condition where the floating roof is in a tilted position.

5. The method according to claim 1, further comprising:
forming residuals of the filtered echo amplitudes during the time period;
determining a time slot when the residuals of the filtered echo amplitudes fall behind the threshold; and
generating a message in which time intervals a fault condition appeared.

6. The method according to claim 4, further comprising:
forming residuals of the filtered echo amplitudes during the time period;
comparing, during the time period, the residuals of the filtered echo amplitudes with the filtered echo amplitudes; and identifying only a time slot as a fault condition, where the floating roof was tilted, when the corresponding gradient of the filtered echo amplitudes falls behind the threshold.

7. The method according to claim 6, further comprising:
dynamically adapting the filtering of the floating roof level signal outside the time slots where an abnormal or fault condition is identified, in order to reduce noise on the measured floating roof level signal and its gradient.

8. The method according to claim 6, further comprising:
determining the amplitude of the gradient of the echo amplitudes when the floating roof has been tilted, and/or the tilting angle of the floating roof during the fault condition.

9. The method according to claim 4, further comprising:
determining the height of the floating roof in the tank when the fault condition is detected.

10. The method according to claim 9, further comprising:
checking if a vertical guiding system for guiding the floating roof relative to the tank is defective at the height where the fault condition appeared.

11. A system for detecting the tilt of a floating roof floating on a medium stored in a tank, comprising:
a radar level gauge mounted in a fixed position on the tank, wherein the radar level gauge is configure to emit signals in the direction of the floating roof and to receive echo signals reflected on the surface of the floating roof; and
an edge device remotely located from the radar level gauge, wherein the edge device includes a first data interface for communication with the radar level gauge and a second data interface for communication with a server via internet in the cloud,
wherein the system is configured to:
determine and record a level of the floating roof during a time period, wherein the time period includes some filling/emptying cycles of the medium in the tank;
detect and record echo amplitudes of the echo signals over the time period;
filter the echo amplitudes and record the filtered echo amplitudes during the time period;
calculate a gradient of the filtered echo amplitudes during the time period;
calculate a threshold value for a tolerable deviation of the gradient of the filtered echo amplitudes during the time period; and
generate an alert message that a roof tilting is detected if the deviation of the gradient of the filtered echo amplitudes falls behind the threshold.

* * * * *